(12) United States Patent
Snead (10) Patent No.: US 10,226,121 B2
(45) Date of Patent: Mar. 12, 2019

(54) INTERLOCKING CONSTRUCTION SYSTEM FOR MODULAR CABINETS

(71) Applicant: David Snead, Guilford, CT (US)

(72) Inventor: David Snead, Guilford, CT (US)

(*) Notice: Subject to any disclaimer, the term of this patent is extended or adjusted under 35 U.S.C. 154(b) by 0 days.

(21) Appl. No.: 15/425,430

(22) Filed: Feb. 6, 2017

(65) Prior Publication Data

US 2018/0220796 A1    Aug. 9, 2018

(51) Int. Cl.
| | | |
|---|---|---|
| *A47B 47/00* | (2006.01) | |
| *A47B 87/00* | (2006.01) | |
| *F16B 12/24* | (2006.01) | |
| *F16B 12/20* | (2006.01) | |

(52) U.S. Cl.
CPC .......... *A47B 47/0025* (2013.01); *A47B 47/00* (2013.01); *A47B 47/0091* (2013.01); *A47B 87/008* (2013.01); *F16B 12/20* (2013.01); *F16B 12/24* (2013.01)

(58) Field of Classification Search
CPC ............ A47B 47/0025; A47B 47/0091; A47B 47/042; A47B 47/0041; A47B 2230/0077; A47B 47/0008; A47B 47/0033; A47B 47/04; A47B 47/05; A47B 47/00; A47B 47/005; A47B 95/00; A47B 96/1466; A47B 2230/0062; A47B 2230/0081; A47B 47/03; A47B 2230/07; A47B 77/00; A47B 87/008; F16B 12/125; F16B 12/02; F16B 12/46; F16B 2200/30; F16B 12/00; F16B 2012/463; F16B 5/0052; F16B 12/26; F16B 12/24; F16B 2012/466; F16B 12/20; A47F 3/004

USPC .......... 312/108, 111, 140, 263, 265.5, 265.1, 312/265.4, 198, 257.1, 351.1, 107, 138.1, 312/114, 195, 264, 265.2, 265.6, 350

See application file for complete search history.

(56) References Cited

U.S. PATENT DOCUMENTS

| | | | | |
|---|---|---|---|---|
| 3,125,387 A | * | 3/1964 | Abrahamson | .......... A47B 13/06 108/92 |
| 3,195,968 A | | 7/1965 | Freeman | |
| 3,379,483 A | * | 4/1968 | Oldford | ............... A47B 47/042 312/257.1 |
| 3,393,031 A | * | 7/1968 | Morrill | ................. A47F 5/0025 211/126.15 |
| 3,632,179 A | * | 1/1972 | Vredevoogd | ............ A47B 3/00 248/188.91 |

(Continued)

*Primary Examiner* — Hiwot E Tefera
(74) *Attorney, Agent, or Firm* — DeLio, Peterson & Curcio LLC; Thomas E. Ciesco (57) ABSTRACT

A system for assembling a cabinet which includes a first base member having a first length and a base member channel extending the first length of the base member. The system includes a second base member having a second length, a second base member channel extending the second length of the second base member, a pair of opposing secondary members each having a third length and a secondary member channel extending the third length of the secondary members and a first cap member disposable in the base member channel. The system includes a first and second locking member disposable in each of the secondary member channels, the locking member extending from the first base member to the second base member when the cabinet is fully assembled. The locking members are engagable with the first and second base member channel for securing the secondary members to first and second base members.

10 Claims, 9 Drawing Sheets

(56) References Cited

U.S. PATENT DOCUMENTS

| | | | | |
|---|---|---|---|---|
| 3,713,718 | A * | 1/1973 | Lucci | A47B 47/04 217/12 R |
| 3,722,971 | A * | 3/1973 | Zeischegg | A47B 47/042 312/107 |
| 4,047,777 | A * | 9/1977 | Pfeifer | A47B 47/042 312/263 |
| 4,114,065 | A * | 9/1978 | Horvay | F25D 21/04 220/592.1 |
| 4,378,137 | A * | 3/1983 | Gibson | A47B 87/02 312/108 |
| 4,750,794 | A * | 6/1988 | Vegh | A47B 47/042 312/195 |
| 4,790,609 | A | 12/1988 | Guy | |
| 4,822,117 | A * | 4/1989 | Boston, Jr. | F25D 23/062 29/455.1 |
| 4,830,080 | A | 5/1989 | Densen | |
| 5,487,690 | A | 1/1996 | Stoffle et al. | |
| 5,527,103 | A * | 6/1996 | Pittman | A01K 63/006 217/12 R |
| 5,647,181 | A | 7/1997 | Hunts | |
| 5,803,561 | A * | 9/1998 | Puehlhorn | F16B 12/125 312/263 |
| 6,015,149 | A | 1/2000 | Burk | |
| 6,223,917 | B1 * | 5/2001 | Bruder | A47B 47/0008 211/182 |
| 6,899,404 | B1 * | 5/2005 | King | A47B 87/008 312/111 |
| D550,484 | S | 9/2007 | Bonatti | |
| 7,677,830 | B1 * | 3/2010 | Brown | A47C 3/00 312/140 |
| D617,174 | S | 6/2010 | Schaefer et al. | |
| D639,143 | S | 6/2011 | Schaefer et al. | |
| 8,082,971 | B1 | 12/2011 | Peterson et al. | |
| 8,733,851 | B2 * | 5/2014 | Lee | A47B 47/005 312/108 |
| 9,826,828 | B1 * | 11/2017 | Vaughan, Jr. | A47B 47/0066 |
| 2006/0207957 | A1 * | 9/2006 | Chen | A47B 47/0025 211/188 |
| 2013/0057125 | A1 * | 3/2013 | Ma | F16B 12/2036 312/108 |
| 2013/0106268 | A1 * | 5/2013 | Hsu | A47B 47/0008 312/263 |
| 2014/0286701 | A1 * | 9/2014 | Sauer | F16B 12/125 403/375 |
| 2017/0181539 | A1 * | 6/2017 | Linden | A47B 47/0091 |
| 2018/0092460 | A1 * | 4/2018 | Stack | A47B 47/042 |

\* cited by examiner

INTERLOCKING CONSTRUCTION SYSTEM FOR MODULAR CABINETS

BACKGROUND OF THE INVENTION

1. Field of the Invention

The present invention relates generally to an apparatus and method for constructing cabinets and more specifically to the system for joining cabinet sections or pieces.

2. Description of Related Art

SUMMARY OF THE INVENTION

Bearing in mind the problems and deficiencies of the prior art, it is therefore an object of the present invention to provide a modular cabinet system which allows for easy and precise assembly and installation.

It is another object of the present invention to provide a locking system to secure the connector members to one another.

It is a further object of the present invention to provide a locking system which allows easy and precise connector assembly and installation.

It is still another object of the present invention to provide an interlocking construction system for modular cabinets which allows for a finished appearance of the cabinet openings and connections.

Still other objects and advantages of the invention will in part be obvious and will in part be apparent from the specification.

The above and other objects, which will be apparent to those skilled in the art, are achieved in the present invention which is directed to a system for assembling a cabinet comprising a first base member having a first length and a base member channel extending the first length of the base member. The system includes a second base member having a second length and a second base member channel extending the second length of the second base member, a pair of opposing secondary members each having a third length and a secondary member channel extending the third length of the secondary members and a first cap member disposed in the base member channel. The system includes a locking, member disposed in each of the secondary member channels, the locking member extending from the upper channel to the lower channel, the locking member engaged with the upper channel and lower channel for securing the vertical members to the top and bottom cross members. The system may include a cabinet door and at least one hinge rotatingly securing the cabinet door to one of the vertical members.

Another aspect of the present invention is directed to a method for constructing a cabinet arrangement comprising providing a bottom cross member having a first length and an upper channel extending the first length of the bottom cross member, a top cross member having a second length and a lower channel extending the second length of the top cross member and a pair of opposing vertical members each having a third length and a side channel extending the third length of the vertical members. The system includes providing a cap member disposable in the upper channel of the bottom cross member and a locking member disposable in each of the side channels, the locking member extendable from the upper channel to the lower channel, the locking member engagable with the upper channel and lower channel for securing the vertical members to the top and bottom cross members. The system includes securing the bottom member to a lower horizontal surface, inserting the cap member into a portion of the bottom member channel, placing at least one vertical member adjacent the bottom member and inserting the locking member into the at least one vertical member channel and engaging a bottom portion of the locking member into the bottom member channel, securing the at least one vertical member to the bottom member.

Another aspect of the present invention is directed to a method for constructing a cabinet arrangement comprising providing at least one base member having a base member length and a base member channel extending the length of the at least one base member, the base member channel having a base channel width. The method includes providing a plurality of secondary members, each secondary member having a secondary member length and at least one secondary member channel having a secondary channel width substantially the same as the base channel width, the secondary channel extending the length of the secondary member and a plurality of flat panels, each flat panel having a flat panel width substantially the same as the base channel width and four panel edges. The method includes providing a plurality of cap members each having a cap member length, a cap member body having a body width substantially the same as the base channel width and extending the length of the cap member and a cap member face having a width larger than the body width, the cap member body disposable in the base channel or secondary channel. The method includes providing a plurality of locking members each having a locking member length, a locking member body having a body width substantially the same as the base channel width and extending the length of the locking member and a locking member face having a width wider than the locking member body width and a length shorter than the length of the locking member length, the locking member body disposable in the base channel or secondary channel. The method includes securing the at least one base member to a wall, ceiling or floor surface and placing a first of the plurality of secondary members adjacent and perpendicular to the base member so that adjacent edges of a first of the plurality of flat panels engage the at least one base member channel and first secondary member channel, respectively. The method includes inserting the cap member into a portion of the base member channel and inserting a first end portion of the locking member having the short face into the first of the plurality of secondary member channel and engaging the first end portion of the locking member into the base member channel, securing the first of the plurality of secondary members to the base member.

Another aspect of the present invention is directed to a system for assembling a cabinet. The system includes a first base member having a first length and a base member channel extending the first length of the base member. The system includes a second base member having a second length and a second base member channel extending the second length of the second base member. The system includes a pair of opposing secondary members each having a third length and a secondary member channel extending the third length of the secondary members and a first cap member disposable in the base member channel. The system includes a first and second locking member disposable in each of the secondary member channels, the locking member extending from the first base member to the second base member when the cabinet is fully assembled. The locking members are engagable with the first and second base member channel for securing the secondary members to the first and second base members. The locking member may include an elongated body having a body length engagable with the first and second base member channels and a tongue extending from an end of the body, the tongue engagable with the secondary member channels. The locking member may include a flange extending the elongated body length. The flange may have a width substantially the same as a thickness of the secondary members. The first base member, second base member and pair of secondary members may be the face of the cabinet. The system may include a cabinet door and at least one hinge rotatingly securing the cabinet door to one of the vertical members.

Another aspect of the present invention is directed to a method for constructing a cabinet arrangement. The method comprises providing a bottom cross member having a first length and an upper channel extending the first length of the bottom cross member and a top cross member having a second length and a lower channel extending the second length of the top cross member. The method includes providing a pair of opposing vertical members each having a third length and a side channel extending the third length of the vertical members and a cap member disposable in the upper channel of the bottom cross member. The method includes providing a locking member disposable in each of the side channels, the locking member extendable from the upper channel to the lower channel, the locking member engagable with the upper channel and lower channel for securing the vertical members to the top and bottom cross members. The method includes securing the bottom member to the lower horizontal surface, inserting the cap member into a portion of the bottom member channel and placing at least one vertical member adjacent the bottom member. The method includes inserting the locking member into the at least one vertical member channel and engaging a bottom portion of the locking member into the bottom member channel, securing the at least one vertical member to the bottom member.

Another aspect of the present invention is directed to a method for constructing a cabinet arrangement comprising providing at least one base member having a base member length and a base member channel extending the length of the at least one base member, the base member channel having a base channel width. The method includes providing a plurality of secondary members, each secondary member having a secondary member length and at least one secondary member channel having a secondary channel width substantially the same as the base channel width, the secondary channel extending the length of the secondary member. The method includes providing a plurality of flat panels, each flat panel having a flat panel width substantially the same as the base channel width and four panel edges and providing a plurality of cap members each having a cap member length, a cap member body having a body width substantially the same as the base channel width and extending the length of the cap member and a cap member face having a width larger than the body width, the cap member body disposable in the base channel or secondary channel. The method includes providing a plurality of locking members each having a locking member length, a locking member body having a body width substantially the same as the base channel width and extending the length of the locking member and a locking member face having a width wider than the locking member body width and a length shorter than the length of the locking member length, the locking member body disposable in the base channel or secondary channel. The method includes securing the at least one base member to a wall, ceiling or floor surface and placing a first of the plurality of secondary members adjacent and perpendicular to the base member so that adjacent edges of a first of the plurality of flat panels engage the at least one base member channel and first secondary member channel, respectively. The method includes inserting the cap member into a portion of the base member channel and inserting a first end portion of the locking member having the short face into the first of the plurality of secondary member channels and engaging the first end portion of the locking member into the base member channel, securing the first of the plurality of secondary members to the base member.

Another aspect of the present invention is directed to a method for constructing a cabinet opening comprising providing a cabinet system including a first base member having a first length and a base member channel extending the first length of the base member. The system includes a second base member having a second length and a second base member channel extending the second length of the second base member. The system includes a pair of opposing secondary members each having a third length and a secondary member channel extending the third length of the secondary members and a first cap member disposable in the base member channel. The system includes a first and second locking member disposable in each of the secondary member channels, the locking member extending from the first base member to the second base member when the cabinet is fully assembled. The locking members are engagable with the first and second base member channel for securing the secondary members to the first and second base members. The method includes placing one of the pair of secondary members against and at right angle to the first base member and inserting the cap member into a portion of the first base member channel. The method includes inserting a first end portion of the locking member having the short face into one of the secondary member channels and engaging the first end portion of the locking member into the base member channel, securing the first of the plurality of secondary members to the base member, fastening at least one additional secondary member and fastening at least one additional flat panel to the at least one additional secondary member. The method may include fastening the cap member in the first base member channel after the step of inserting the cap member into a portion of the first base member channel. The method may include fastening the locking member in the one of the pair of secondary member channels after the step of inserting the locking member into a portion of the one of the pair of secondary members. The step of fastening of the cap member in the first base member channel may include gluing, nailing, screwing or stapling. The step of inserting the cap member into a portion of the base member channel may be completed before the step of placing one of the pair of secondary members against and at right angle to the first base member. The method may include providing a cabinet door and hingedly securing the door to one of the secondary members.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-32 of the drawings in which like numerals refer to like features of the invention.

The present invention is directed to a system which includes connection members for linking flat panels in the construction of cabinets, storage units, shelves and the like. The connection members include an elongated body 120 with at least one groove 130 extending the length of the connection member. The flat panel may be plywood, particle board, composite board or any material which can be used in construction.

The attached FIGS. 1-20 show five different connection members, each connection member shown in a perspective view, end view, top view and side view, respectively.

A quad connection member 2 shown in FIGS. 1-4 includes four grooves 130 extending from the elongated body at 90° from one another.

Figures 1, 2:
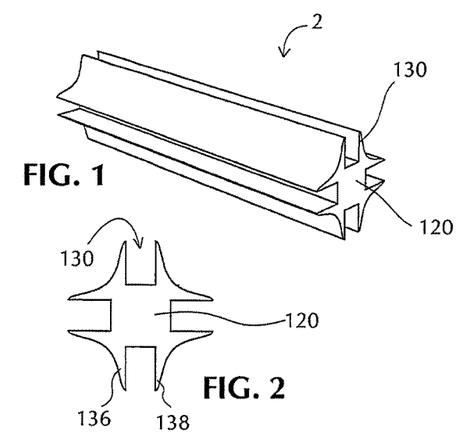
FIG. 1 is a perspective view of one embodiment of the connection member according to the present invention.
FIG. 2 is an end view of the connection member shown in FIG. 1.
Figure 3:
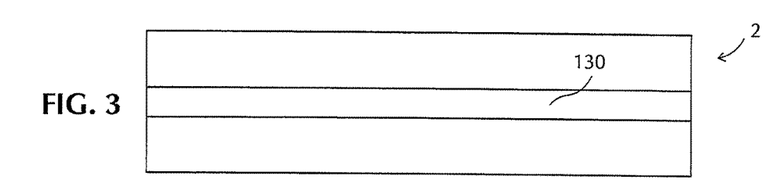
FIG. 3 is a top view of the connection member shown in FIG. 1.
Figure 4:
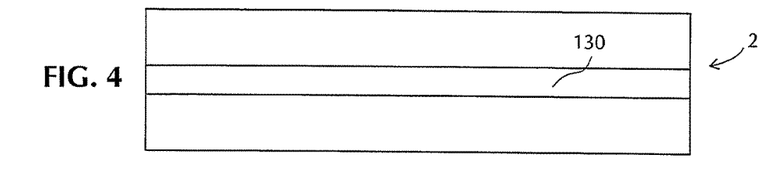
FIG. 4 is a side view of the connection member shown in FIG. 1.
Figures 5, 6:
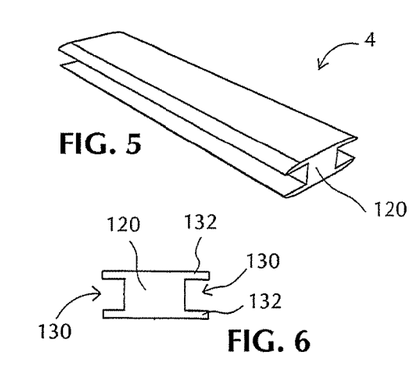
FIG. 5 is a perspective view of a second embodiment of the connection member according to the present invention.
FIG. 6 is an end view of the connection member shown in FIG. 5.
Figure 7:
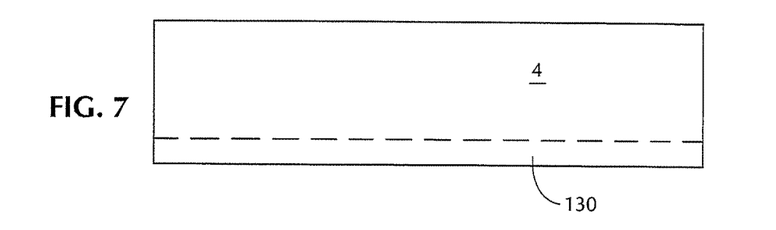
FIG. 7 is a top view of the connection member shown in FIG. 5.
Figure 8:
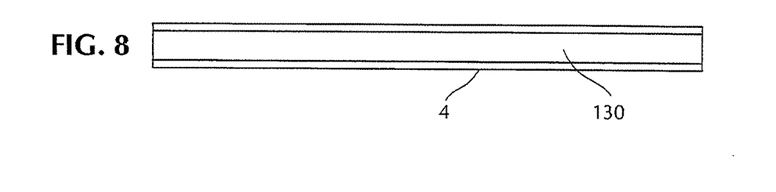
FIG. 8 is a side view of the connection member shown in FIG. 5.
Figure 9:
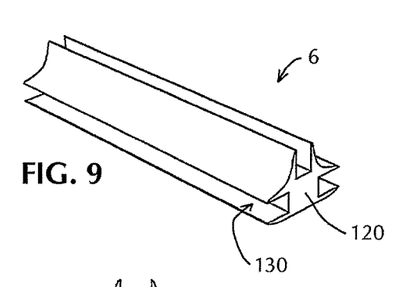
FIG. 9 is a perspective view of a second embodiment of the connection member according to the present invention.
Figure 10:
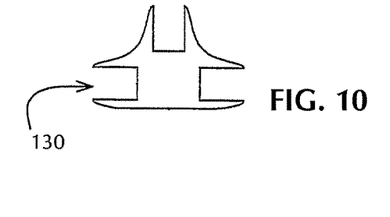
FIG. 10 is an end view of the connection member shown in FIG. 9.
Figure 11:
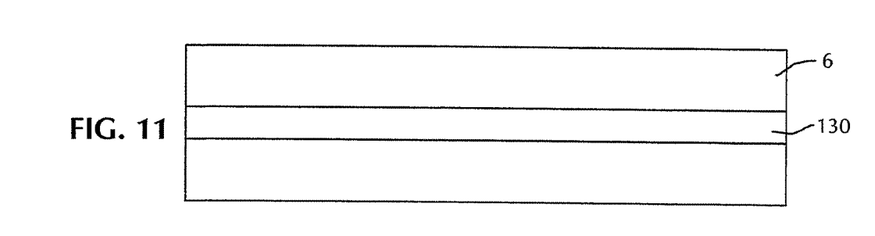
FIG. 11 is a top view of the connection member shown in FIG. 9.
Figure 12:
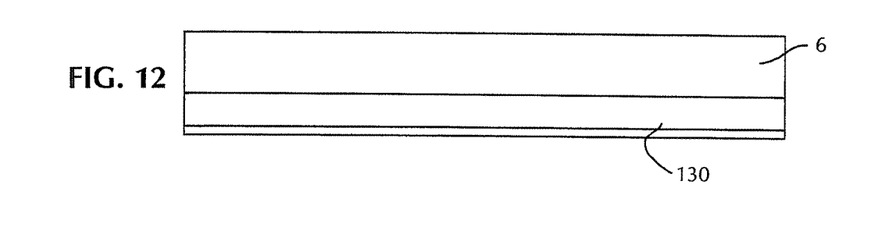
FIG. 12 is a side view of the connection member shown in FIG. 9.
Figure 13:
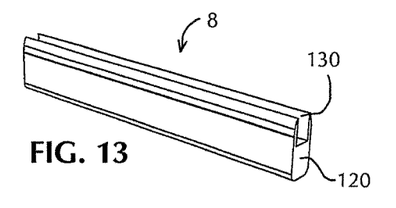
FIG. 13 is a perspective view of a second embodiment of the connection member according to the present invention.
Figure 14:
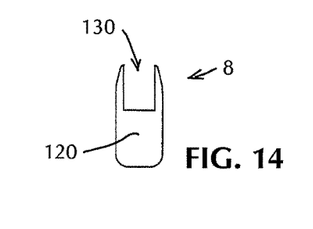
FIG. 14 is an end view of the connection member shown in FIG. 13.
Figure 15:
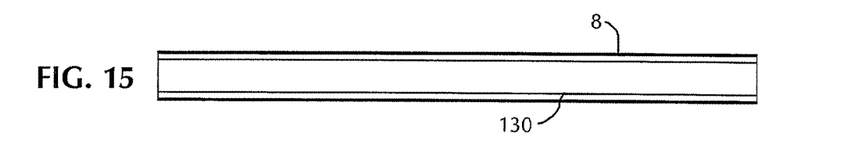
FIG. 15 is a top view of the connection member shown in FIG. 13.
Figure 16:
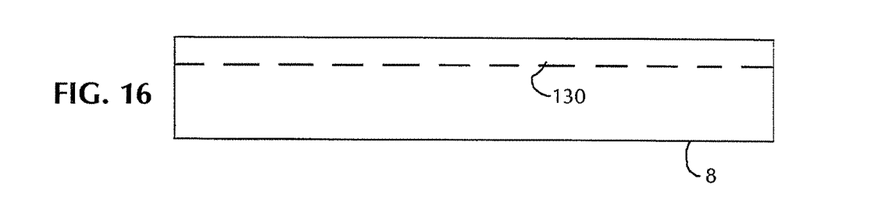
FIG. 16 is a side view of the connection member shown in FIG. 13.
Figure 17:
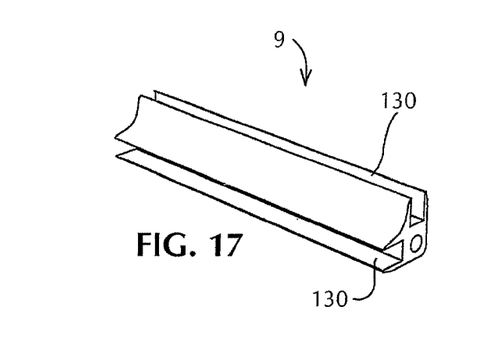
FIG. 17 is a perspective view of a second embodiment of the connection member according to the present invention.
Figure 18:
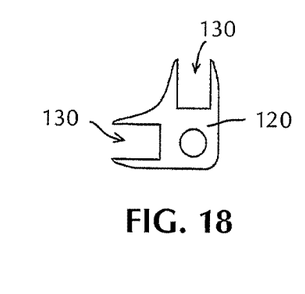
FIG. 18 is an end view of the connection member shown in FIG. 17.
Figure 19:
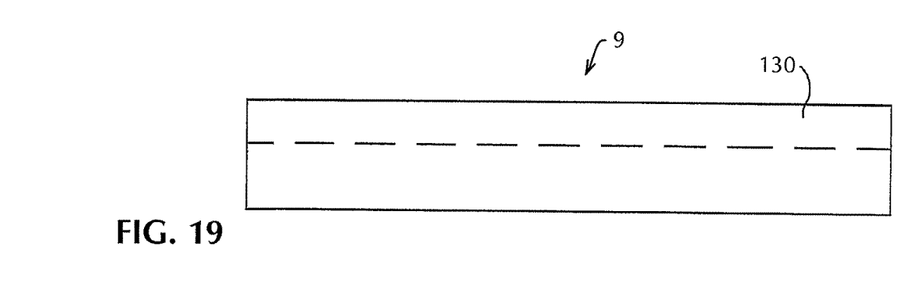
FIG. 19 is a top view of the connection member shown in FIG. 17.
Figure 20:
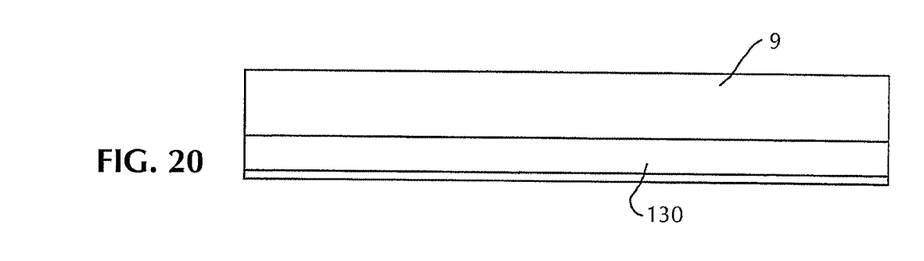
FIG. 20 is a side view of the connection member shown in FIG. 17.

A straight connection 4 member shown in FIGS. 5-8 includes two grooves 130 extending from the elongated body at 180° from one another. FIG. 6 shows one embodiment of the cross section of the groove with the flanges 132 having a square end. FIG. 2 shows an alternate groove with flanges 136,138 having a tapered end. A triple connection member or T-connection member 6 shown in FIGS. 9-12 includes two grooves 130 extending from the elongated body at 180° from one another and a third groove 130 extending 90° from the two grooves. An edge connection member or base member 8 shown in FIGS. 13-16 includes one groove extending from the elongated body. A corner connection member 9 shown in FIGS. 17-20 includes two grooves extending from the elongated body at 180° from one another. FIGS. 17 and 18 show the elongated body including an aperture extending through the length of the connection member. The quad connection member may be used as any one of the other connection members by trimming off one or more channels. The connection members may be cut to any size to accommodate the length of the attached flat panel. Two single channel members may be placed back to back with one back surface having a mitered edge to allow adjacent panels extend at any angle from one another. An L-bracket may be used in placing two connection members perpendicular to one another.

The connection members may be made from wood, plastic, metal, composite or any material which can be formed into an elongated channel. The connection member may incorporate any color or texture during manufacture. The channel may be of any width to accommodate a flat panel. The connection members may eliminate the need for trim molding. When used as a base portion, the connection member face is the base molding. A door may be attached to a vertical connection member with hinges to allow the door to swing about the vertical connection member. The door may compromise a plurality of connections members in combination with at least one flat panel. When used as a top portion, the connection member may first be placed on the flat panel top edge and then the panel put in place without the installer having to climb a ladder.

Figure 21:
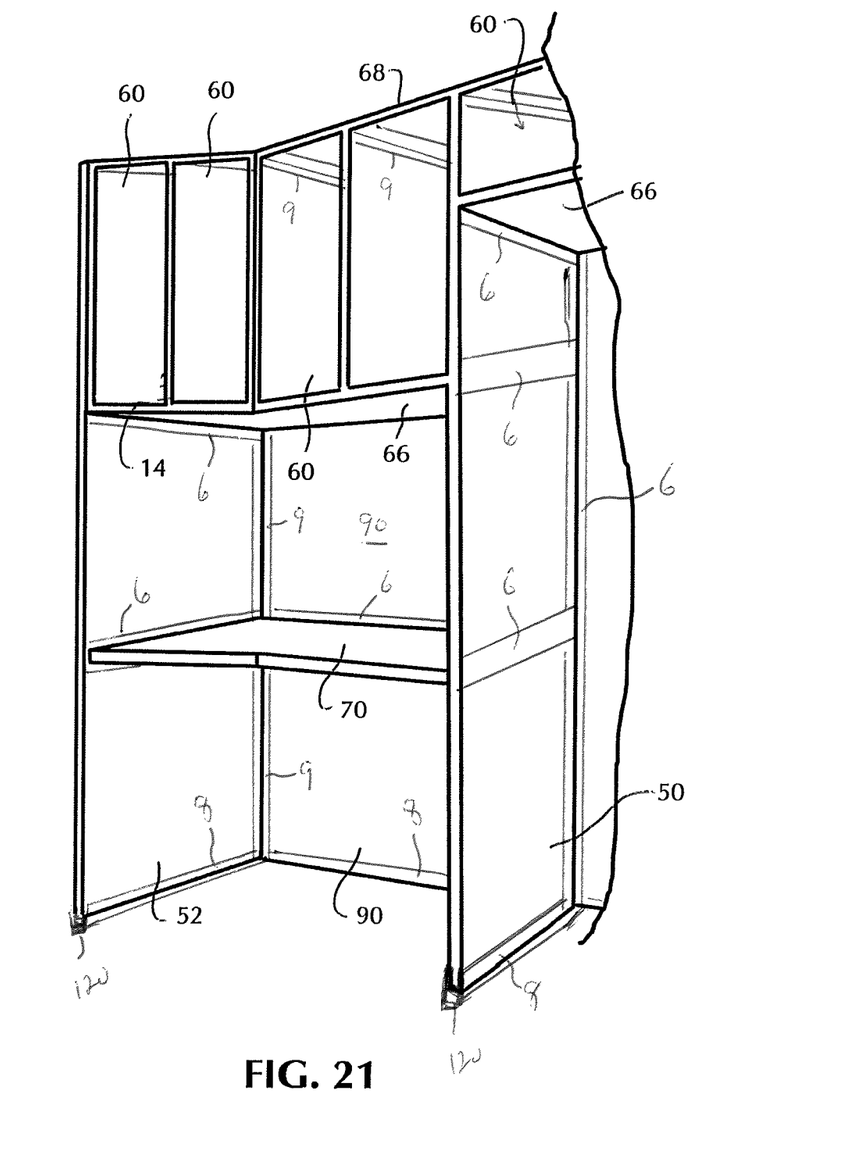
FIG. 21 is a perspective view of a modular cabinet system according to the present invention.
Figure 22:
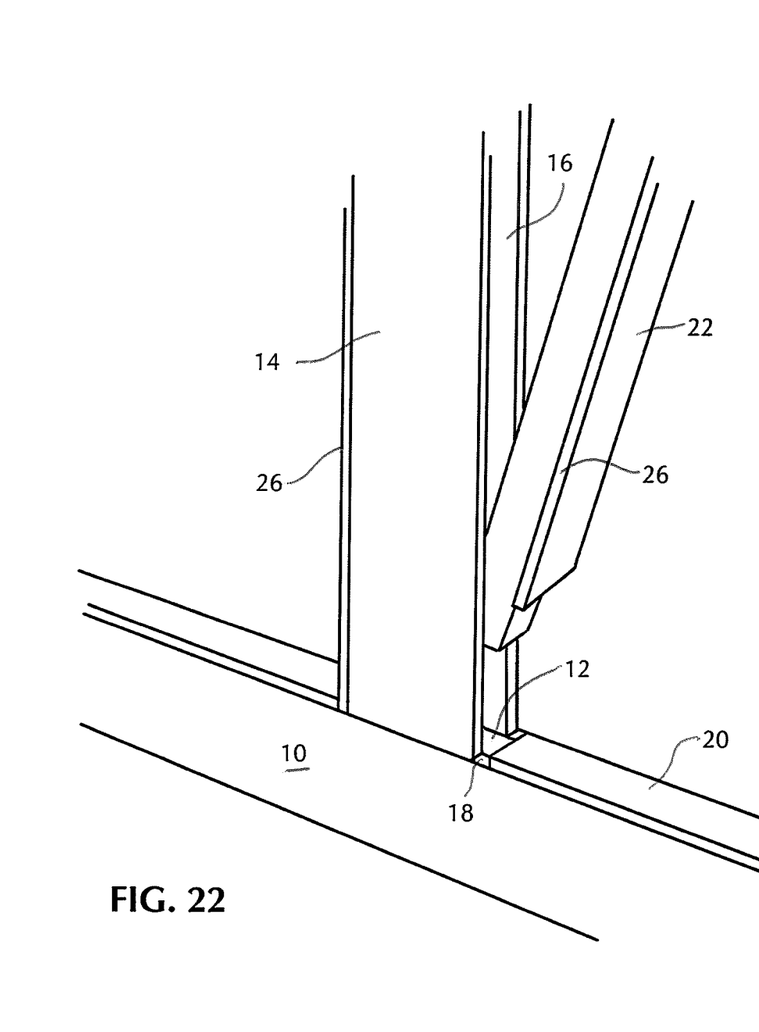
FIG. 22 is a perspective view of the locking system for a modular cabinet system according to the present invention.
Figure 23:
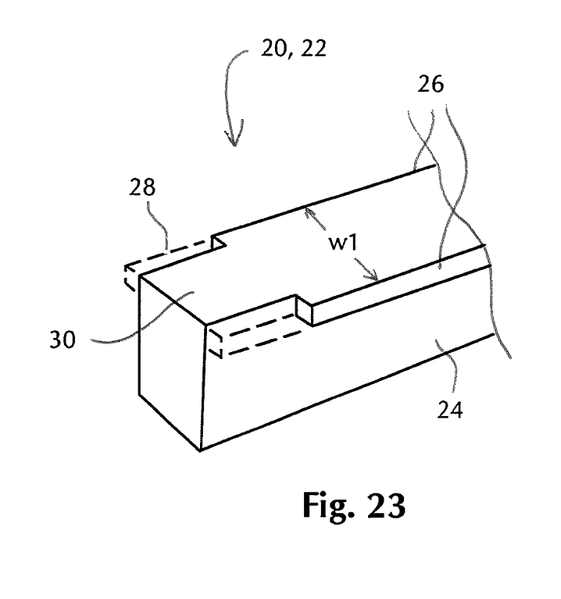
FIG. 23 is a perspective view of a locking member according to the present invention.
Figure 24:
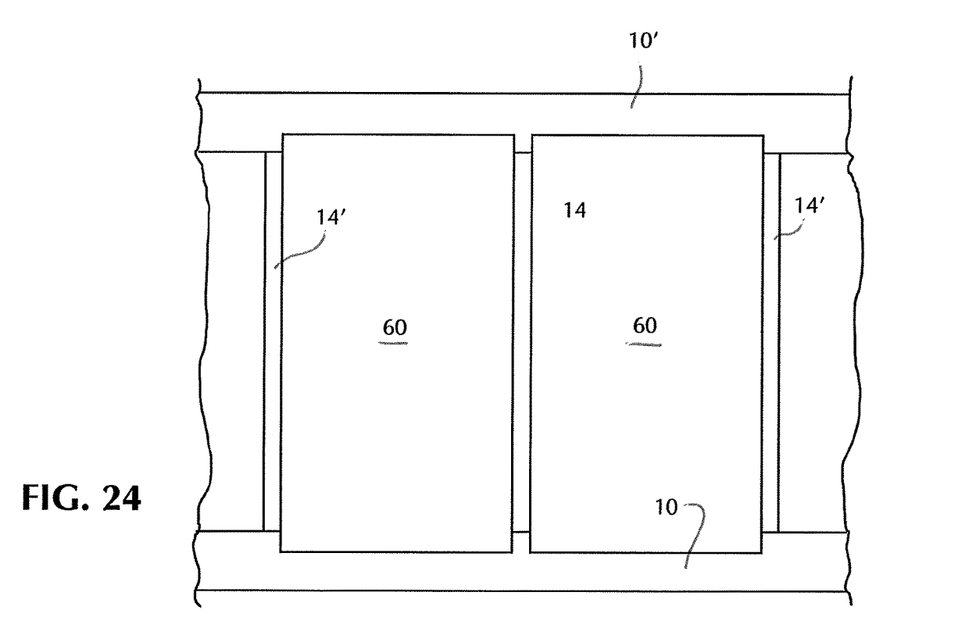
FIG. 24 is a front elevational view of a cabinet having locking system according to the present invention.
Figure 25:
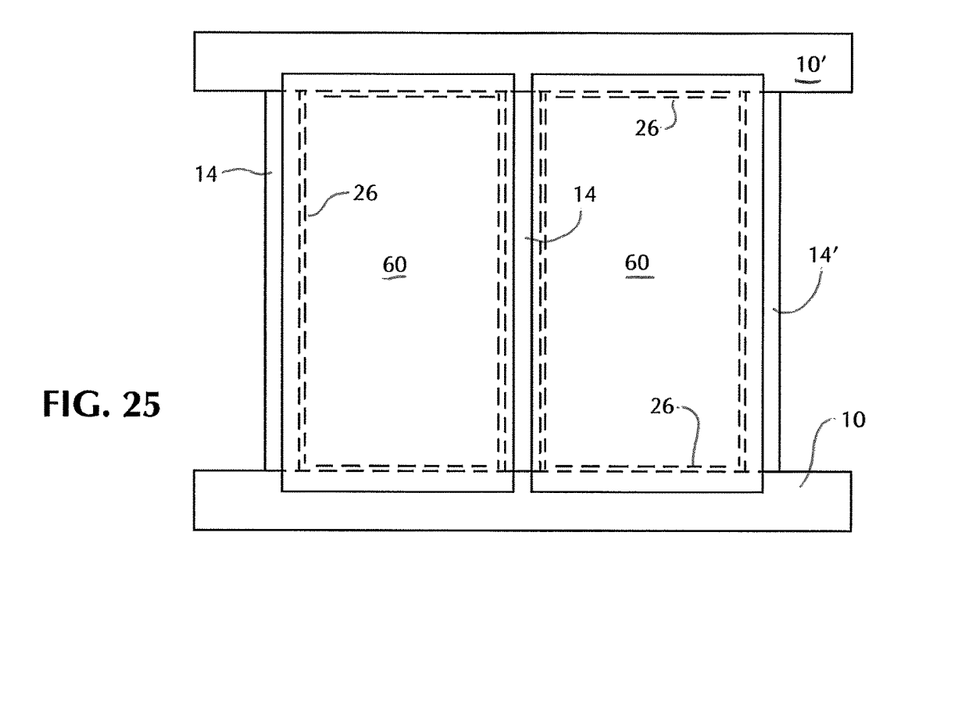
FIG. 25 is a front elevational view of the cabinet shown in FIG. 4 with the locking members shown in phantom lines.

FIG. 21 shows the implementation of the members in a finished cabinet system. The edge connection member 8 may be used to attach a panel to a wall, ceiling, floor or other cabinet part by screws, glue or other attachment method. The elongated body 120 is first fastened to the wall, ceiling, etc. The edge of panel 300 is then inserted into the groove 130 and fastened. Corner connection member 9 may be used to connect panels at 90° to one another. Triple connection member of T-member 6 may join a shelf or cabinet bottom to a lower panel and upper panel. Quad connection members 2 may connect a horizontal shelf to an upper panel and lower panel. The cabinet system includes a pair of side panels 50,52 and cabinet doors 60. A cabinet bottom panel 66 and top panel 68 may be secured to the side panels or rear wall 90. The cabinet may include a shelf 70 attached to the side panels 50,52 and the rear wall 90 using the modular cabinet system above. FIGS. 22 and 23 show an enlarged view of the locking system securing the horizontal connectors 10,10' to the vertical connectors 14, 14' of FIGS. 4 and 5. The locking system includes channel caps 20,22 engagable with channels 12,16 of the horizontal connector 10 and the vertical connector 14, respectively. The channel cap 20,22 includes an elongated body 24 with the channel 12,16 and a flange extending from the elongated body 24. The flange 26 has a flange width w1 substantially corresponding with the width of the vertical connector 14 and the horizontal connector 10. The horizontal connector 10 and the vertical connector 14 may be any of the configurations described in the modular system described above. The channel cap 20 includes an elongated body 24 and flange 26. The channel cap 22 includes an elongated body 24, flange 26, a pair of opposing flange notches 28 and a tongue 30.

Figures 26, 27, 28, 29:
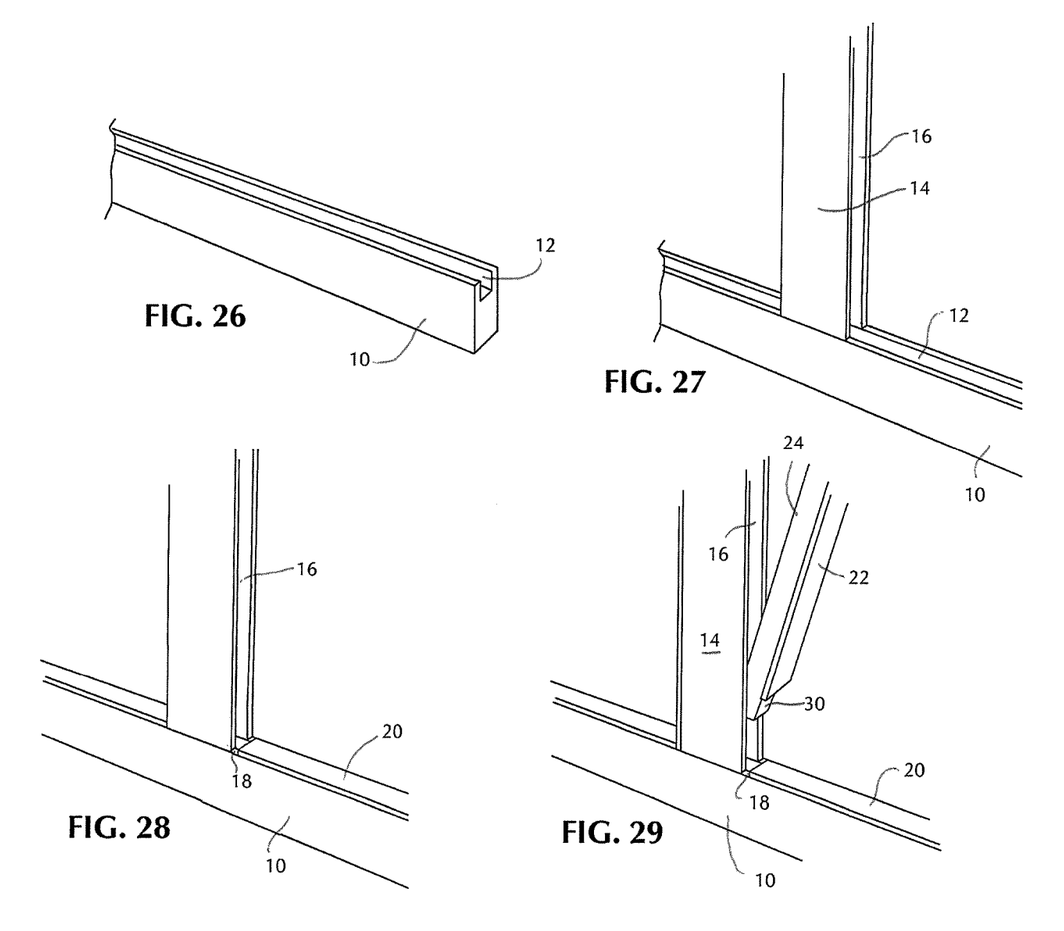
FIG. 26 is a perspective view of a first step in a method for assembling a cabinet arrangement.
FIG. 27 is a perspective view of another step in a method for assembling a cabinet arrangement.
FIG. 28 is a perspective view of another step in a method for assembling a cabinet arrangement.
FIG. 29 is a perspective view of another step in a method for assembling a cabinet arrangement.
Figure 30:
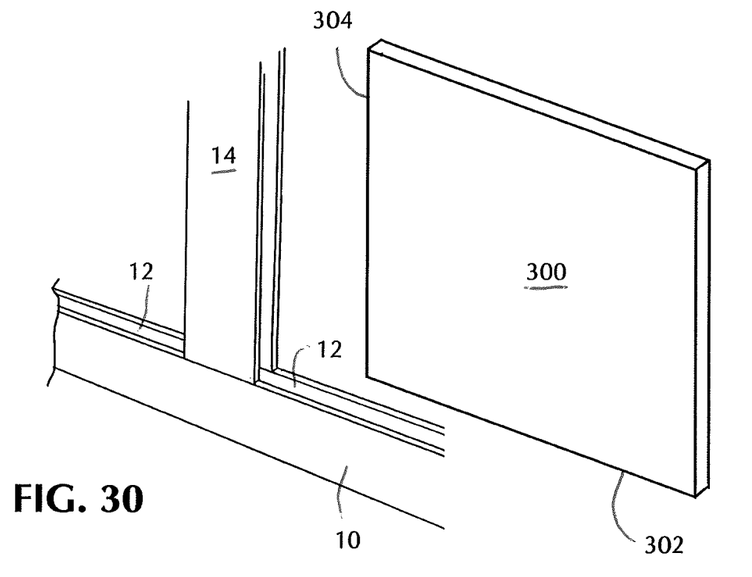
FIG. 30 is perspective views of a first step in a method for assembling a cabinet arrangement.
Figure 31:
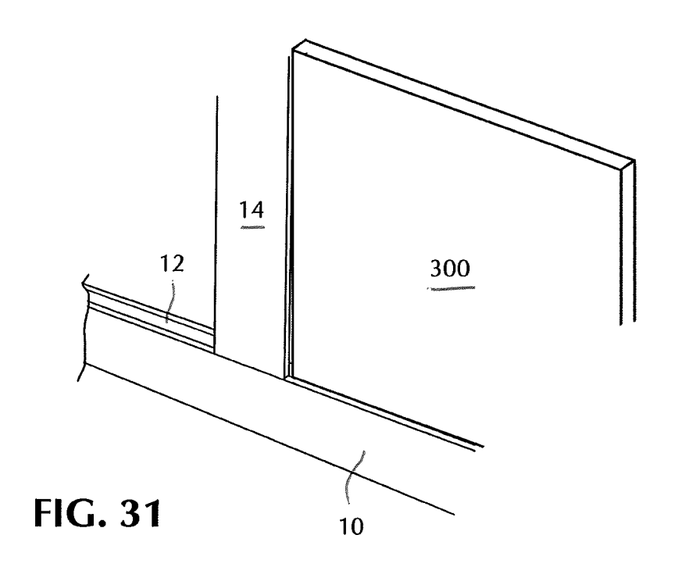
FIG. 31 is a perspective view of another step in a method for assembling a cabinet arrangement.

In a method of assembling the cabinet locking system as shown in FIGS. 26-31, the steps for assembling the cabinet portion having the door openings follow FIGS. 26-29, respectively and the steps for assembling the solid panel portions follow FIGS. 26,27,30 and 31 respectively. The bottom end of the vertical member 14 is placed adjacent the channel 12 of the horizontal member 10. The vertical member 14 is perpendicular to the horizontal member 10. The channel cap 20 is placed in the horizontal member channel 12 so only the flange 26 is showing. A space 18 is provided by positioning the channel cap 20 a small distance from the vertical member 14 so that the tongue 30 of channel cap 22 may be slid into channel 12 as the channel cap 22 is inserted into channel 16 and slid downward until the tongue 30 is fully engaged with the channel 12. The channel caps 20,22 should be sufficiently wide to provide a friction fit into the channels 12,14. An adhesive may be applied to the elongated body 24 before assembly into the channel 12,14. Alternately, brads or other fasteners may be used to secure the elongated body 24 in the channel 12,14. The tongue 30 prevents the horizontal member 10 from shifting with respect to the vertical member 14. For assembled sections which include a solid panel rather than an opening for a door, the steps of FIGS. 26 and 27 are followed by the steps shown in FIGS. 30 and FIGS. 31. Adjacent edges 302,304 of flat panel 300 are inserted into slots 12 and 16, respectively. The steps for assembly with the flat panel 300 and with the caps 20 and locking members 24 are followed by the assembly of additional connectors, caps, locks and panels until the completion of the desired cabinet arrangement.

Figure 32:
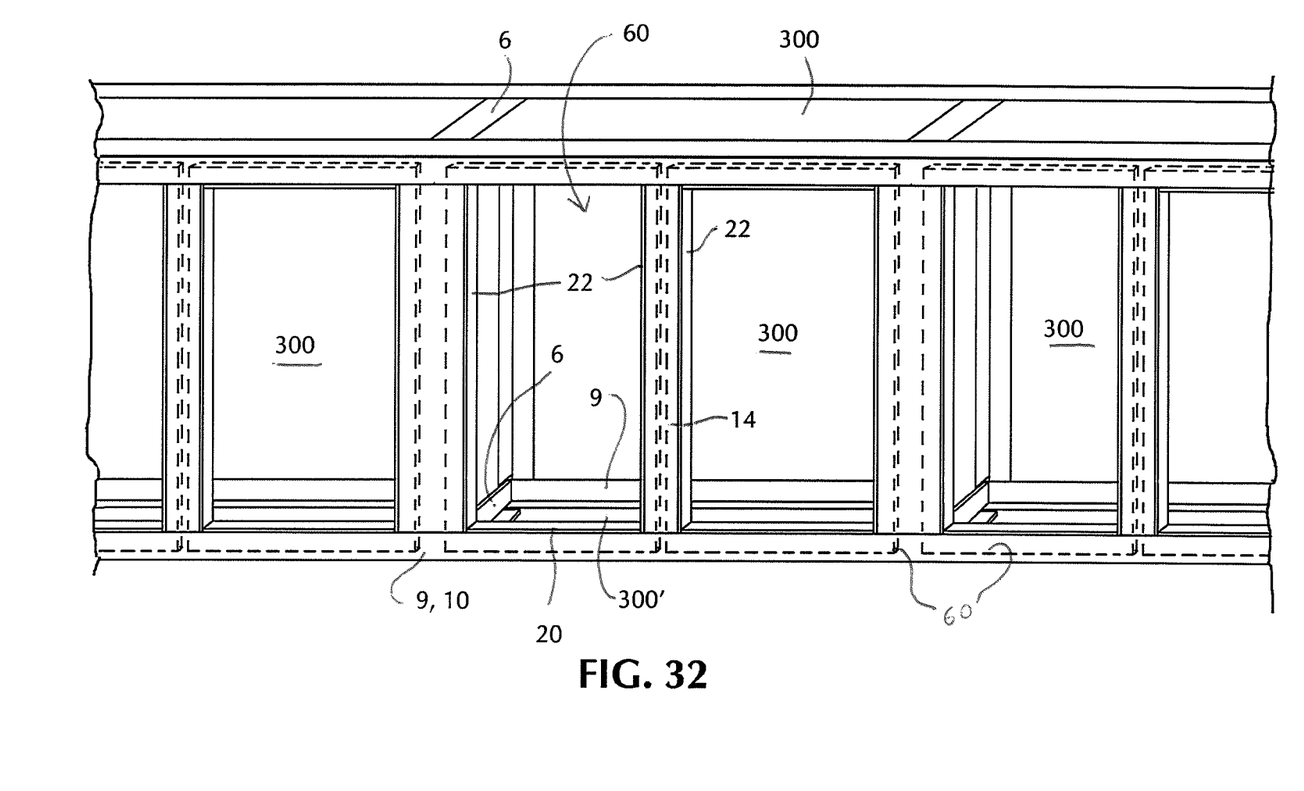
FIG. 32 is a front perspective view of an assembled cabinet arrangement according to the present invention.

FIG. 32 shows a cabinet arrangement which includes a plurality of cabinet sections. A method of assembling the cabinet arrangement described below is accompanied by FIGS. 27-29. The cabinet arrangement includes at least one base member 10 having a base member length and a base member channel extending the length of the at least one base member, the base member channel having, a base channel width. The base member 10 may alternately be a corner connector 9 for connecting a bottom flat panel 300' and for providing a finished opening 60. The cabinet arrangement includes a plurality of secondary members 14, each secondary member 14 having a secondary member length and at least one secondary member channel 16 having a secondary channel width substantially the same as the base channel width, the secondary channel extending the length of the secondary member. The cabinet arrangement includes a plurality of flat panels 300, each flat panel having a flat panel thickness substantially the same as the base channel width, four panel edges and a plurality of cap members 20 each having a cap member length, a cap member body having a body width substantially the same as the base channel width and extending the length of the cap member 20 and a cap member flange or face 26 having a width larger than the body width, the cap member body 24 disposable in the base channel 12 or secondary channel 16. The cabinet arrangement includes a plurality of locking members 22 each having a locking member length, a locking member body 24 having a body width substantially the same as the base channel width and extending the length of the locking member 22 and a locking member face 22 having a width wider than the locking member body width and a length shorter than the length of the locking member length, the locking member body disposable in the base channel or secondary channel. The method includes securing the at least one base member 10 to a wall, ceiling or floor surface and placing a first of the plurality of secondary members 14 adjacent and perpendicular to the base member 10 so that adjacent edges of a first of the plurality of flat panels 300 engage the at least one base member channel 12 and first secondary member channel 16, respectively. The method includes inserting the cap member 20 into a portion of the base member channel 12 and inserting a first end portion or tongue 30 of the locking member 22 having the short face into the first of the plurality of secondary member channel 16 and engaging the first end portion 30 of the locking member into the base member channel 12, securing the first of the plurality of secondary members 14 to the base member 12.

The objects of the present invention set forth in the summary of the invention have been met in the system and method described herein and provides a modular cabinet system which allows for easy and precise assembly and installation and provides a locking system to secure the connector members to one another. The present invention also provides a locking system which allows easy and precise connector assembly and installation and provides an interlocking construction system for modular cabinets which allows for a finished appearance of the cabinet openings and connections.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A system for assembling a cabinet comprising:
   a first base member having a first length and a first base member channel extending the first length of the first base member;
   a second base member having a second length and a second base member channel extending the second length of the second base member;
   a pair of opposing secondary members each having a third length and a secondary member channel extending the third length of the secondary members;
   a first cap member disposable in the first base member channel; and
   a first and second locking members, each locking member disposable in the respective secondary member channel, the locking members extending from the first base member to the second base member when the cabinet is fully assembled;

wherein the locking members are engagable with the first and second base member channels when each locking member is disposed in the respective secondary member channel for securing the secondary members to the first and second base members; and wherein each locking member includes an elongated body having a length, a tongue extending from opposite ends of the elongated body and a flange extending the length of the body, each tongue engageable with the respective base member channel when each locking member is disposed in the respective secondary member channel; wherein each flange has a width substantially the same as a thickness of the secondary members.

2. The system of claim 1 wherein the first base member, second base member and pair of secondary members are the face of the cabinet.

3. The system of claim 1 including a cabinet door and at least one hinge rotatingly securing the cabinet door to one of the opposing secondary members.

4. A method for constructing a cabinet arrangement comprising:

providing at least one base member having a base member length and a base member channel extending the length of the at least one base member, the base member channel having a base channel width;

providing a plurality of secondary members, each secondary member having a secondary member length and at least one secondary member channel having a secondary channel width substantially the same as the base channel width, the secondary member channel extending the length of the secondary member;

providing a plurality of flat panels, each flat panel having a flat panel width substantially the same as the base channel width and four panel edges;

providing a plurality of cap members each having a cap member length, a cap member body having a body width substantially the same as the base channel width and extending the length of the cap member and a cap member face having a width larger than the body width, the cap member body disposable in the base member channel or secondary member channel;

providing a plurality of locking members each having a locking member length, a locking member body having a body width substantially the same as the base channel width and extending the length of the locking member, a locking member face having a width wider than the locking member body width and a length shorter than the length of the locking member length whereby a tongue is disposed on a first end portion of the locking member, the locking member body disposable in the base member channel or secondary member channel;

securing the at least one base member to a wall, ceiling or floor surface;

placing a first of the plurality of secondary members adjacent and perpendicular to the base member so that adjacent edges of a first of the plurality of flat panels engage the at least one base member channel and a first of the secondary member channel, respectively;

inserting a cap member of the plurality of cap members into a portion of the base member channel; and inserting one of the locking members into the first of the plurality of secondary member channels and engaging the first end portion of the locking member into the base member channel, securing the first of the plurality of secondary members to the base member.

5. A method for constructing a cabinet opening comprising:

providing the cabinet system of claim 1;

placing one of the pair of secondary members against and at right angle to the first base member;

inserting the cap member into the first base member channel;

inserting the elongated body of one of the locking members into the respective secondary member channel and engaging each tongue of the locking member into the respective base member channel, securing the one of the pair of secondary members to the first base member; fastening the other of the secondary members against the first and second base members; and fastening at least one flat panel to one of the secondary members.

6. The method of claim 5 including fastening the cap member in the first base member channel after the step of inserting the cap member into a portion of the first base member channel.

7. The method of claim 6 including fastening the locking member in the one of the pair of secondary member channels after the step of inserting the locking member into the one of the pair of secondary members.

8. The method of claim 5 wherein the step of fastening of the cap member in the first base member channel includes gluing, nailing, screwing or stapling.

9. The method of claim 5 wherein the step of inserting the cap member into the base member channel is completed before the step of placing one of the pair of secondary members against and at right angle to the first base member.

10. The method of claim 5 including providing a cabinet door and hingedly securing the door to one of the secondary members.

* * * * *